Nov. 21, 1967  J. R. SANDLIN ET AL  3,354,438

RADAR VIDEO DATA REDUCTION SYSTEM

Filed April 13, 1965

John R. Sandlin
Clyde S. Fuller,
    INVENTORS.
    Harry M. Saragovitz
BY  Edward J. Kelly
    Herbert Berl
    Robert C. Sims
        ATTORNEYS United States Patent Office 3,354,438
Patented Nov. 21, 1967

3,354,438
RADAR VIDEO DATA REDUCTION SYSTEM
John R. Sandlin and Clyde S. Fuller, Satellite Beach, Fla., assignors, by mesne assignments, to the United States of America as represented by the Secretary of the Army
Filed Apr. 13, 1965, Ser. No. 447,931
7 Claims. (Cl. 340—172.5)

ABSTRACT OF THE DISCLOSURE

Ungated radar returns from a radar receiver or video tape player are sent to a sample and hold circuit. A manually controlled delayed gate generator which is fed trigger inputs is connected to a control input of the sample and hold circuit to control when it will sample the returns. A scope is connected to both the output of the generator and to the radar returns. The generator is controlled in response to the display on the scope so that only returns from a single selected target will be sampled by the sample and hold circuit. The output of the sample and hold circuit and a time code are fed to a utilization circuit for processing.

---

This invention relates generally to a radar video data reduction system which accepts video data (ungated radar receiver returns which may be multiple channel) from a video tape playback device and converts it into computer language. More specifically this invention relates to a system which converts radar receiver return or returns to a digital code indication of the relative amplitude of the returned pulse; its "time of day"; and its relative time or range. This information, when taken from the multiple receiver channels of a tracking radar on a pulse-by-pulse basis, may be used to compute trajectory and corrected cross-section of each target within the radar beam.

Some desirable features of a video data reduction system are position of the return within the radar beam so it can be used both for trajectory measurements and cross-section correction. A system incorpoarting the above features has long been needed. Further, a system which has a real time radar signature and discrimination capability is necessary. Another desirable feature of a video data reduction system would be in obtaining limited quantities of beam position corrected Cross Section Data on a pulse by pulse basis from all desired targets recorded on the radar video data tapes.

It is therefore, an object of this invention to provide a video data reduction system in which the radar data is reduced to returns from a single target for presentation to a utilization circuit.

This invention further resides in certain novel features of construction, combinations, and arrangements of parts. Further objects and advantages of the invention will be apparent to those skilled in the art to which it pertains, from the following description of the preferred embodiment thereof described with reference to the accompanying drawing, which forms a part of the specification, and wherein the same reference characters represent corresponding parts throughout the drawing, and in which.

Figure 1:
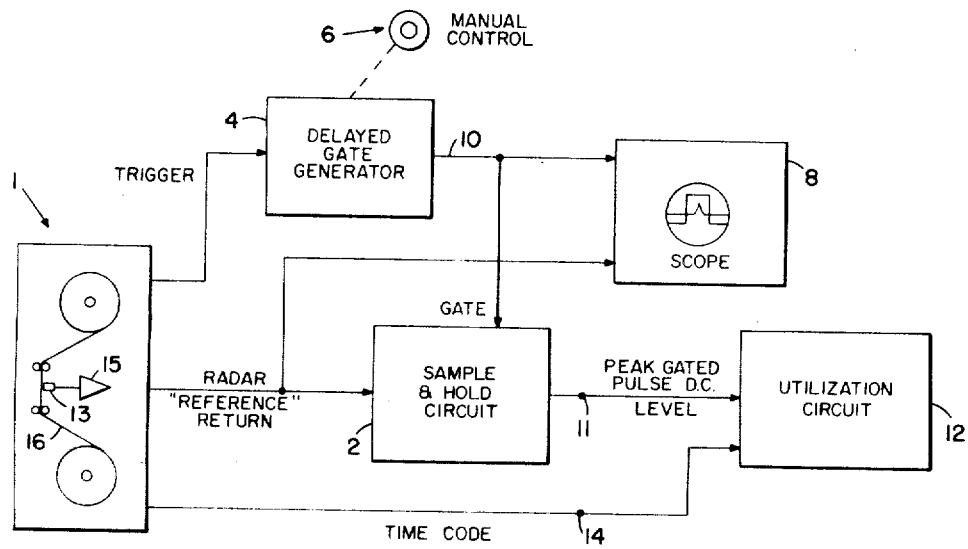
FIGURE 1 is a schematic diagram illustrating the general form of the invention.

In order to better understand the operation of the system described in the drawing, a description of its components referred to is first presented. A video tape play back is indicated as reference numeral 1, in FIGURE 1, however the box indicated by reference numeral 1 can be direct outputs from a radar receiver. The video tape playback may be of any conventional design, such as that used in the patent to Donohoe et al., Patent No. 3,302,180, which was filed on April 9, 1963. A sample and hold circuit 2 is provided with a first input to receive the radar information and has a control input which is gated by way of a delayed gate generator 4 to control the time when circuit 2 will extract radar information. Delayed gate generator 4 is manually controlled as indicated by 6. Delayed gate generator 4 may be of any conventional design, such as a Phantastron circuit triggering a Schmitt circuit as is taught by the patent to Fiske, Patent No. 3,012,721, patented December 12, 1961. A monitor scope 8 having inputs from the delayed trigger pulse 10 and from the radar "reference" return is provided so that the trigger may be positioned so that only one of the returned signals (or targets) of the radar is sampled by the sample and hold circuit 2. The output at 11 of the sample and hold circuit, which is a DC level indicating the peak value of the radar receiver return, is fed to a utilization circuit 12. This DC level changes at the PRF rate of the radar. A time code signal at 14 is also fed to utilization circuit 12. If block 1 is considered as a direct return from the radar then the time code 14 will come from the clock means, not shown, however if 1 is a tape unit having pickup heads 13 and amplifier units 15, this information will be on a given set of tracks of the tape 16 and read out by one of the heads 13.

Figure 2:
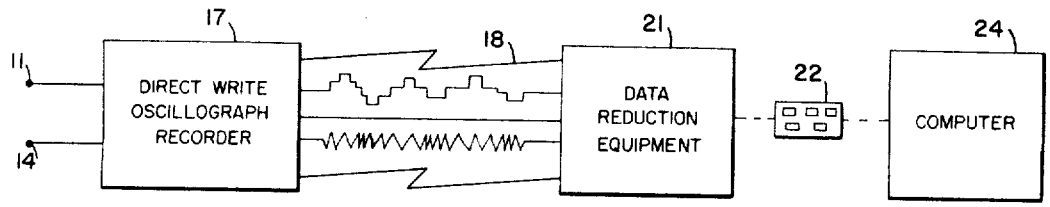
FIGURE 2 is one embodiment of the utilization circuit of FIGURE 1 which this invention may take.

FIGURE 2 shows a direct write oscillograph 17 connected to the outputs 11 and 14. The output of direct write oscillograph 17 is a chart 18 which shows a pulse-by-pulse basis for each manually gated target. The chart 18 is converted to punched cards 22 on a pulse-by-pulse basis by utilizing known data reduction equipment 21. The information on punched cards 22 is calibrated during the reading process, utilizing pre and post calibration derived from the video tape, in the same manner. The reduced data, representing pulse-by-pulse returned power, is converted by the computer 24 to cross section of the target.

Figure 3:
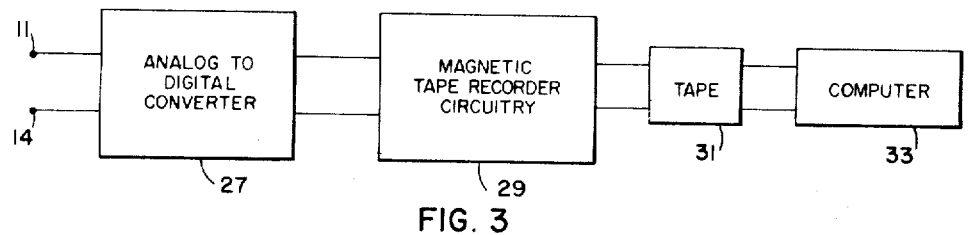
FIGURE 3 illustrates in schematic diagram a further embodiment of the utilization circuit of FIGURE 1.

FIGURE 3 shows that rather than applying the DC level of the gated signal peaks 11 to an oscillograph recorder as in FIGURE 2, these are applied to an analog to digital converter 27 which feeds a magnetic tape recording circuitry 29. The tape 31 thus recorded feeds a computer 33 which performs the same functions as the computer 24 of FIGURE 2.

The operation of the invention occurs in the following manner. The video returns from the radar (either recorded or real time) at 1 are broken up into the tigger gate, radar "reference" return, and time code signals. These returns are on different tracks of the tape 16 and are read out by different heads and amplifier units. The radar return is fed to a scope 8 where it is compared by the operator with the trigger gate which is fed to the scope by way of a delayed gate generator 4. Positioning the trigger gate by manual control means 6 will allow the operator to select a given target from a plurality of target returns. Once selected, the target is automatically locked on to and followed. This will cause the sample and hold circuit to sample only when the radar "reference" return is receiving a return from the selected target. Therefore the peak values of the returned signals of that target can be digitized and fed to a computer for indicating the relative amplitude of the returned pulse, its "time of day" (gotten from a direct read into the utilization circuit from 14), and its relative time or range. This information, when taken from the multiple receiver channels of a tracking radar on a pulse-by-pulse basis is used to compute trajectory and corrected cross-section of each target within the radar beam. Each target can be tracked, and the trigger gate width may be made any width desired.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated. It will be apparent to those skilled in the art that changes may be made in the form of the apparatus disclosed without departing from the spirit of the invention as set forth in the disclosure, and that in some cases certain features of the invention may sometimes be used to advantage without a corresponding use of other features. It is therefore to be understood that within the scope of the appended claims the invention may be practiced otherwise than as specifically described. Accordingly, it is desired that the scope of the invention be limited only by the appended claims.

We claim:

1. A data reduction system in which different information signals present data; said signals occur at different times from each other and each given signal is not continuous in time; a receiver means for detecting these information signals; first means having an output which is a series of discrete values representative of values of its input at a series of points in time; said receiver means having an output which is connected to the input of said first means; said first means further having a control input which controls the time when the first means will extract information from the receiver means; second means having an output so related to the different information signals that, upon being connected to the control input of said first means, only signals of a single one of the different information signals is extracted by the first means from said receiver means; and connections between said second means and the control input of said first means.

2. A data reduction system as set forth in claim 1, wherein said second means is so constructed that it can be varied so as to enable the first means to extract any one of the different information signals.

3. A data reduction system as set forth in claim 2, further comprising a display means, and wherein the outputs of said receiver means and said second means are compared on the display means so that a desired one of the different information signals may be selected by varying the second means.

4. A data reduction system as set forth in claim 3, wherein said first means is a sample and hold circuit and said second means is controlled delay gate means having a trigger pulse input.

5. A data reduction system as set forth in claim 4, wherein said receiver means is a pickup head of a tape unit.

6. A data reduction system as set forth in claim 5, wherein the output of the sample and hold circuit is fed to a utilization circuit which reduces the information to readable form.

7. A radar video data reduction system comprising a tape recording means having a tape upon which is recorded signals received by a radar receiver, trigger signals, and time code signals; said tape recording means having first, second and third outputs; said first output having the trigger signals thereon; said second output having thereon the signals received by the radar receiver; said third output having the time code signals thereon; a variable delayed gate generator having an input connected to said first output; a sample and hold circuit connected to the second output; a scope means having a first input connected to said second output, and a second input connected to an output of said delayed gate generator; said delayed gate generator being controlled in order to obtain a predetermined reading on said scope; the output of said delayed gate generator also being connected to a gate input of the sample and hold circuit so as to control when said sample and hold circuit will sample information from its input; an output of said sample and hold circuit being connected to a first input of a utilization circuit; and said utilization circuit having a second input connected to the third output of said tape recording means.

References Cited

UNITED STATES PATENTS

| | | | |
|---|---|---|---|
| 3,302,180 | 1/1967 | Donohoe et al. | 340—172.5 |
| 3,214,754 | 10/1965 | Hildebrandt | 343—5 |
| 3,148,353 | 9/1964 | Schumann | 340—172.5 |
| 3,177,472 | 4/1965 | Githens | 340—172.5 |
| 3,166,746 | 1/1965 | Jacobson | 340—172.5 |
| 3,035,263 | 5/1962 | Lader et al. | 343—5 |
| 3,018,959 | 1/1962 | Thomas | 340—172.5 |
| 3,012,721 | 12/1961 | Fiske | 343—5 |
| 3,223,996 | 12/1965 | Voles. | |

PAUL J. HENON, *Acting Primary Examiner.*

ROBERT C. BAILEY, *Examiner.*

G. D. SHAW, *Assistant Examiner.*